United States Patent
Byard

(10) Patent No.: US 6,276,834 B1
(45) Date of Patent: Aug. 21, 2001

(54) AXIAL BEARING ELEMENT

(75) Inventor: Clifford Byard, Westport, IN (US)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 09/327,377

(22) Filed: Jun. 8, 1999

(51) Int. Cl.$^7$ .................................................. F16C 17/04
(52) U.S. Cl. ......................... 384/420; 384/368; 384/123
(58) Field of Search ................................... 384/420, 368, 384/369, 370, 371, 424, 425, 426, 427; 29/898.4, 898.41

(56) References Cited

U.S. PATENT DOCUMENTS 4,795,220 * 1/1989 Mori ....................................... 384/420
5,611,628 * 3/1997 Brouwer ................................. 384/220

FOREIGN PATENT DOCUMENTS

569740 * 4/1957 (IT) .

* cited by examiner

Primary Examiner—Sherry Estremsky
Assistant Examiner—Tisha D. Lewis
(74) Attorney, Agent, or Firm—Jones, Tullar, & Cooper

(57) ABSTRACT

The present invention relates to a semicircular or circular axial bearing element, especially a thrust washer or flanged bearing shell or flanged bearing bushing, with valleys on the side facing the sliding partner to form radial oil outlet openings; in order to increase the load carrying capacity, the axial bearing element is formed such that 5 to 8 valleys are provided over an angle of 180 degrees in the circumferential direction, such that rounded peaks points are provided between each 2 recesses, and such that the profile has a depth between peaks and valleys of 0.05 to 0.2 mm.

11 Claims, 2 Drawing Sheets

"G"

AXIAL BEARING ELEMENT

FIELD OF THE INVENTION

The present invention concerns a semicircular or circular, axial bearing element, especially a thrust washer or flanged bearing shell, or flanged bearing bushing, with recesses valleys on the side facing the sliding partner to form radial oil outlet openings.

BACKGROUND OF THE INVENTION

Machines and transmissions are equipped with pumps which maintain a continuous flow of lubricant to the bearings. For bearings, of concern usually are sleeves, bushings or shells whose inner diameter is slightly larger than the diameter of the shaft for which the bearing serves. Pressurized lubricant, usually lubricating oil, is pressed into the gap between the shaft and its bearing element. The shaft is "lifted" by this and floats on the film of lubricant (hydrodynamic lubrication). In this way, less friction, lower temperatures and greater rotational velocity of the shaft are achieved than is the case using ball-bearings filled with lubricant.

The shaft can thus move in the axial direction, that is in the direction toward its ends. Limits are placed on this movement by axial bearing elements of the type being discussed here. If the shaft moves from its specified position, this axial movement is stopped by the axial bearing elements.

One always tries to keep motor components, and, as a part of such group, axial bearing elements, as small as possible, in order to maintain motor and transmission costs low. Axial bearing elements with high load carrying capacity and small size are, consequently, a desired goal.

Laboratory experiments have shown that many of the known constructions of axial bearing elements and their lubrication are ineffective for motor applications. They scarcely increase the load carrying capacity of the bearing.

In the case of a known axial bearing element (thrust bearing) for limiting axial movement of the crank shafts of combustion engines, valleys are provided on the face turned toward the sliding partner. These valleys are very deep, with depths of 0.3 to 0.65 mm. Over a range of 180 degrees, three of these valleys are provided, through which the lubricant can run radially out of the axial bearing location.

Because of the great depth of the valleys, the axial bearing elements must be made very thick. This increases the manufacturing costs, not, however, the load carrying capacity.

SUMMARY OF THE INVENTION

In view of this, it is an object of the present invention to increase the load carrying capacity of axial bearing elements of the above described type, without, however, increasing the space occupied by the structure. Also, manufacturing costs, as compared to costs for known axial bearing elements, should be decreased, or at least remain the same.

The above-mentioned object is achieved, according to the present invention, for an axial bearing element of the described type, by providing five to eight valleys in the circumferential direction over an angle of 180 degrees and by rounding the peaks between each two valleys, and further by providing the profile between the maxima of the peaks and the minima of the valleys with a depth of 0.05 to 0.2 mm.

In further development of the inventive concept, it has proven advantageous when the above-stated depth lies between 0.05 and 0.15 mm.

Additionally it has proven advantageous when five to seven recesses, preferably 6 recesses, are provided over the stated angle of 180 degrees.

It is, furthermore, considered to be especially advantageous when the peaks and valleys, which are preferably both rounded, run continuously into one another.

When, above, reference is made to a rounding of the peaks provided between two valleys, it is meant that, in contrast to the previous state of technology, there is no flat or planar surface shape. Thus, previously, this region between two valleys had an essentially planar shape. It has been found to be especially advantageous when the peaks between two valleys are rounded, hill-shaped, or, when considered in cross-section, of curved surface contour, since, in such case, the lubricant provided in the valleys, which lubricant exits radially outwards, at the same time is taken along in the circumferential direction into the region between the peaks and the sliding partner.

It was ascertained that, by increasing the number of valleys and because of their inventive shape (rounded shape of the peaks, relatively small depth), 50% increase of the load carrying capacity of the axial bearing element of could be achieved. Thus, according to the present invention, more peaks and valleys are provided and these are rounded and exhibit a reduced depth.

It was, however, not only possible to increase the load carrying capacity of the axial bearing element; it was also possible to achieve a higher natural frequency (less fatigue). It is considered especially advantageous that the bearing of the present invention can be used for both directions of rotation.

Also, it was possible to reduce the tendency for the sliding contact layer to separate from the carrier layer during operation. When the valleys are stamped, as is preferred according to the present invention, a smaller pressing force is used, as compared to manufacture of the deeper valleys of the previous practice.

Further details and advantages of the present invention will be understood from the appended claims as well as from the drawings and the following description of a preferred embodiment in the form of a thrust washer.

DESCRIPTION OF THE PREFERRED EMBODIMENTS

Figure 1:
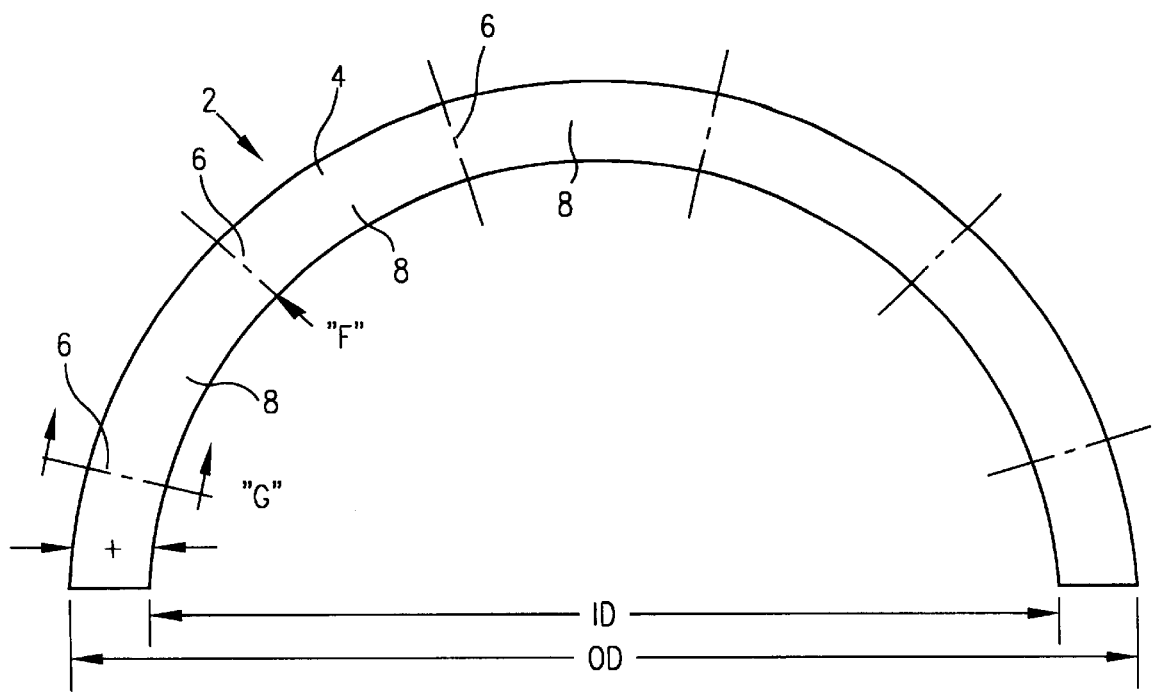
FIG. 1: is a plan view of the axial sliding surface of a thrust washer according to the present invention.

FIG. 1 shows a thrust washer 2 in plan view onto its axial sliding surface 4, which is formed of a light metal alloy based on aluminum with additives improving the tribological properties, such as tin, lead, silicon, etc. This sliding surface is coated onto a carrier layer usually of steel.

The thrust washer 2 extends over a semicircular angle of 180 degrees. It has an inner diameter ID of, for example, 120 mm and an outer diameter OD of, for example, 136 mm. This is indicated in FIG. 1.

Provided in a angular separation of 30 degrees equidistantly from one another are high points 6 and between them valleys 8. The peaks are indicated by radial, dashed lines.

Figure 2:
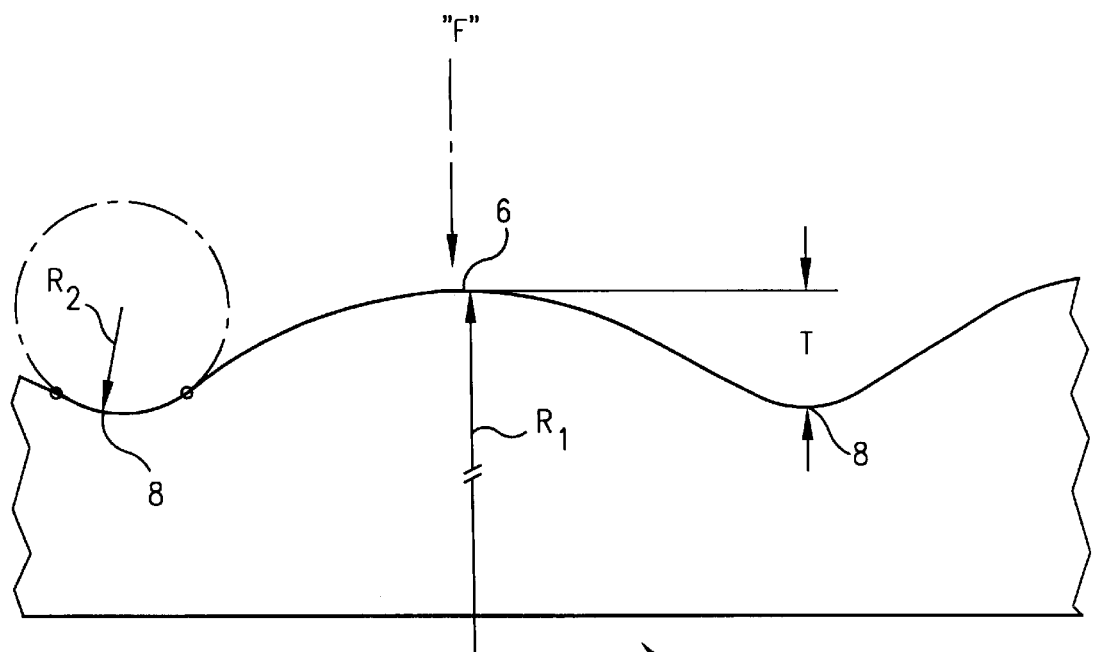
FIG. 2: is a view of the thrust washer of FIG. 1 seen in the direction of the arrow "F" in FIG. 1.

This structure is shown in FIG. 2, where the vertical scale has been greatly exaggerated, in order to illustrate the present invention in the region of the peaks and valleys.

In the presentation in FIG. 2, one sees the rounding of the peaks 6, which are thus not flat, but, instead, curved or arc-shaped. There results from this a wedge-shaped volume in the circumferential direction between the thrust washer 2 and its sliding partner (not shown). Due to the formation of the wedge-shaped volume, lubrication oil is taken along in the rotational direction, out of the valleys 8 and toward the peaks 6. This significantly increases the lubricating effect and, consequently, the load carrying capacity of the bearing.

In the illustrated, preferred case, the peaks 6 describe in the circumferential direction at least sectionally a region which follows a circular line and has a radius of curvature R1 of 1500 mm. Also the valleys 8 describe in the circumferential direction at least sectionally a circular line with a radius of curvature R2 of 7 mm.

Figure 3:
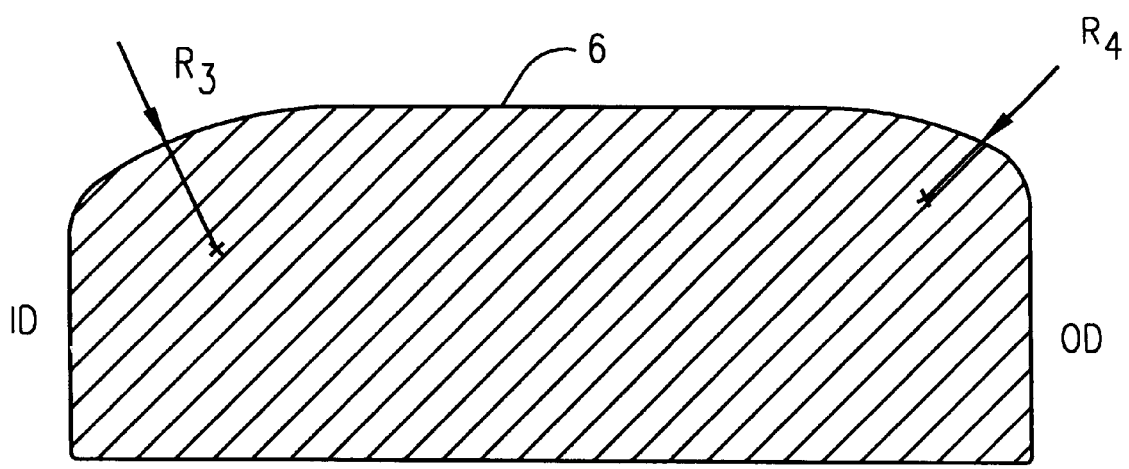
FIG. 3: is a cross sectional view of the thrust washer of FIG. 1 taken in the cutting plane "G" of FIG. 1.

FIG. 3 shows a cross sectional view of the plane "G" of FIG. 1. The section runs through a raised portion 6 of the thrust washer 2 in the radial direction. One recognizes that the surface of the sliding contact describes a curve whose curvature on the radially inner side ID of the thrust washer 2 is less than on the radially outer side OD. The radii of curvature are illustrated in FIG. 3, R3 on the radially inner side and R4 on the radially outer side of FIG. 3.

What is claimed is:

1. An axial bearing element used with a sliding partner, and defining a circumferential direction and a radial direction, having between 5 and 8 valleys with rounded peaks arranged between adjacent valleys in said circumferential direction facing the sliding partner to form oil outlet openings extending in the radial direction, said series of valleys and rounded peaks extending over a circumferential angle of approximately 180 degrees, and wherein the depth of said valleys between adjacent rounded peaks is between 0.05 mm to 0.2 mm.

2. The axial bearing element as defined in claim 1, wherein said depth is between 0.05 mm to 0.15 min.

3. The axial bearing element as defined in claim 1, wherein between 5–7 recesses are provided over the circumferential angular range of 180 degrees.

4. The axial bearing element as defined in claim 1, wherein said recesses and said rounded high points run continuously into one another in the circumferential direction.

5. The axial bearing element as defined in claim 1, wherein said recesses are arranged at equal distances from each other.

6. The axial bearing element as defined in claim 1, wherein said axial bearing element is semicircular.

7. The axial bearing element as defined in claim 1, wherein said axial bearing element is circular.

8. The axial bearing element as defined in claim 1, wherein said axial bearing element comprises a thrust washer.

9. The axial bearing element as defined in claim 1, wherein said axial bearing element comprises a flanged bearing shell.

10. The axial bearing element as defined in claim 1, wherein said axial bearing element comprises a flanged bearing bushing.

11. An axial bearing element used with a sliding partner, and defining a circumferential direction, having between 5 and 8 valleys with rounded peaks arranged between adjacent valleys in said circumferential direction facing the sliding partner to form radial oil outlet openings, said series of valleys and rounded peaks extending over a circumferential angle of approximately 180 degrees, wherein the depth of said valleys between adjacent rounded peaks is between 0.05 mm to 0.2 mm, and wherein said depth between rounded peaks and valleys lies between ID/800 and ID/2400, where the ID equals a given inner diameter of the axial bearing element.

* * * * *